(12) United States Patent
Fast (10) Patent No.: US 6,293,620 B1
(45) Date of Patent: Sep. 25, 2001

(54) HORIZONTAL LATCH

(75) Inventor: Scott J. Fast, Chesterfield, MI (US)

(73) Assignee: Fisher Dynamics Corporation, St. Clair Shores, MI (US)

( * ) Notice: Subject to any disclaimer, the term of this patent is extended or adjusted under 35 U.S.C. 154(b) by 0 days.

(21) Appl. No.: 09/448,778

(22) Filed: Nov. 24, 1999

(51) Int. Cl.$^7$ .................... A47C 1/025; A47C 1/026; B60N 2/10
(52) U.S. Cl. .............. 297/325; 297/327; 297/362.12
(58) Field of Search .................. 297/366, 367, 297/331, 332, 362.12, 335, 325, 329, 327

(56) References Cited

U.S. PATENT DOCUMENTS

| | | |
|---|---|---|
| 4,765,680 | 8/1988 | Kawashima . |
| 4,925,229 | 5/1990 | Siebler . |
| 4,969,682 | 11/1990 | Gray . |
| 4,973,104 | 11/1990 | Nakayama et al. . |
| 5,007,680 | 4/1991 | Miyauchi et al. . |
| 5,154,476 * | 10/1992 | Haider et al. ................. 297/367 |
| 5,238,285 | 8/1993 | Holdampf et al. . |
| 5,240,309 | 8/1993 | Kojer . |
| 5,433,507 * | 7/1995 | Chang .......................... 297/367 |
| 5,590,932 * | 1/1997 | Olivieri ....................... 297/367 |
| 5,622,410 | 4/1997 | Robinson . |
| 5,660,440 | 8/1997 | Pejathaya . |
| 5,718,481 | 2/1998 | Robinson . |
| 5,749,625 | 5/1998 | Robinson . |
| 5,769,493 | 6/1998 | Pejathaya . |
| 5,788,330 | 8/1998 | Ryan . |
| 5,938,286 | 8/1999 | Jones et al. . |

* cited by examiner

Primary Examiner—Peter M. Cuomo
Assistant Examiner—Rodney B. White
(74) Attorney, Agent, or Firm—Harness, Dickey & Pierce, P.L.C.

(57) ABSTRACT

A latch assembly for use in a vehicle having a movable component such as an upper seat frame member and a fixed component such as a lower seat frame member. The latch assembly is operable to allow selective movement of the movable component relative to the fixed component. The latch assembly includes a first frame member adapted to be fixed to the fixed component of the vehicle seat and a second frame member adapted to be fixed to the movable component of the vehicle. The second frame member is coupled to the first frame member for movement between a first operative position, such as a set position, and a second position such as a titled position. The latch assembly also includes a locking mechanism, a release mechanism, a spring, and a lockout cam. The locking mechanism is coupled to one of the first and second frame members for movement between a locked mode to lock the second frame in its first operative position and an unlocked mode wherein the second frame member is freely movable relative to the first frame member. The release mechanism is operable in a biasing mode to operatively engage the locking mechanism and exert a first biasing force urging the locking mechanism toward its locked mode and a released mode removed from operative engagement with the locking mechanism. The spring exerts a second biasing force that urges the locking mechanism toward its locked mode. The second biasing force is less than the first biasing force so that the locking mechanism is urged towards its locked mode when the release mechanism is in its biasing mode and into its unlocked mode when the release mechanism is in its released mode. The lockout cam is operable in a blocking position to maintain the locking mechanism in its unlocked mode when the second frame member is in its first operative position and a retracted position wherein the locking mechanism is movable from its unlocked mode to its locked mode.

27 Claims, 5 Drawing Sheets

HORIZONTAL LATCH

BACKGROUND OF THE INVENTION

1. Technical Field

The present invention relates generally to automotive vehicle seats and, more particularly, to a latch mechanism for selectively coupling a striker pin fixed to a component of the seat to the vehicle body.

2. Discussion

Many vehicles are equipped with tiltable seats to allow easy access to storage areas. Tiltable seats are most commonly in found in passenger trucks, sports utility vehicles, and mini-vans to provide efficient access to storage areas and for selective use of certain interior spaces for passenger accommodations such as tables. The tiltable seats generally include a latching mechanism that is operative in a latched mode to secure the seat in an operative position for use as a seat and in an unlatched position where the seat is movable from the operative position to the stored position.

Commonly used latch mechanisms generally include a retention claw that is pivotably coupled to the vehicle seat frame or the vehicle floor for movement between the latched and unlatched positions. The mechanism further includes a retention pin on the other of the seat frame and vehicle floor in operative engagement with the hook. An exemplary latching mechanism is illustrated and described in U.S. Pat. No. 5,238,235 titled "Folding Vehicle Bedseat".

While prior art latching mechanisms are generally effective at selectively securing the vehicle seat to the vehicle floor, they present packaging problems and permit undesirable movement of the vehicle seat commonly referred to as chucking. More particularly, in available latches, the claw generally protrudes from the seat when the claw is in its unlatched position. The protruding claw is susceptible to snagging on clothing and otherwise obstructing access to the vehicle interior.

In view of the above, a continuing need exists to develop a latch that may be used in a seat, that is effectively packaged, and that minimizes or eliminates undesirable chucking.

SUMMARY OF THE INVENTION

Accordingly, it is an object of the invention to provide a latch assembly for a vehicle seat that is operable to permit selective tilting of the vehicle seat from an operative position to a dumped position.

A further object of the present invention is to provide a latch assembly for a vehicle seat that reduces chucking when the vehicle seat is in an operating position.

Still another object of the present invention is to provide a latch assembly for a vehicle seat that is effectively packaged relative to the seat frame and vehicle floor.

These and other objects are obtained by providing a latch assembly adapted for use in a vehicle having a movable component such as an upper seat frame member and a fixed component such as a lower seat frame member. The latch assembly is operable to allow selective movement of the movable component relative to the fixed component. The latch assembly includes a first frame member adapted to be fixed to the fixed component of the vehicle seat and a second frame member adapted to be fixed to the movable component. The second frame member is coupled to the first frame member for movement between a first operative position, such as a set position, and a second position such as a titled position. The latch assembly also includes a locking mechanism, a release mechanism, a spring, and a lockout cam. The locking mechanism is coupled to one of the first and second frame members for movement between a locked mode to lock the second frame in its first operative position and an unlocked mode wherein the second frame member is freely movable relative to the first frame member. The release mechanism is operable in a biasing mode to operatively engage the locking mechanism and exert a first biasing force urging the locking mechanism toward its locked mode and a released mode removed from operative engagement with the locking mechanism. The spring exerts a second biasing force that urges the locking mechanism toward its locked mode. The second biasing force is less than the first biasing force so that the locking mechanism is urged towards its locked mode when the release mechanism is in its biasing mode and into its unlocked mode when the release mechanism is in its released mode. The lockout cam is operable in a blocking position to maintain the locking mechanism in its unlocked mode when the second frame member is in its first operative position and a retracted position wherein the locking mechanism is movable from its unlocked mode to its locked mode.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given here below and the accompanying drawings wherein.

DETAILED DESCRIPTION OF THE PREFERRED EMBODIMENT

The present invention relates to a latch assembly that is adapted for use in a vehicle seat. Those skilled in the art should appreciate that the latch assembly may be used in a variety of seat applications including the illustrated embodiment wherein the latch assembly is adapted for incorporation into a vehicle seat 10 having an upholstered seatback 12 and an upholstered seat bottom 14. Those skilled in the art will further appreciate that the latch assembly of the present invention may be used in a variety of other applications to selectively couple a movable element of a vehicle, and particularly a vehicle seat, to a fixed element thereof. By way of example rather than limitation, the present invention may be incorporated to selectively fix the position of a head rest to a vehicle seat. In such an application, the anti-chucking feature of the present invention as well as its aesthetic and functional advantages will be particularly beneficial.

Figure 1:
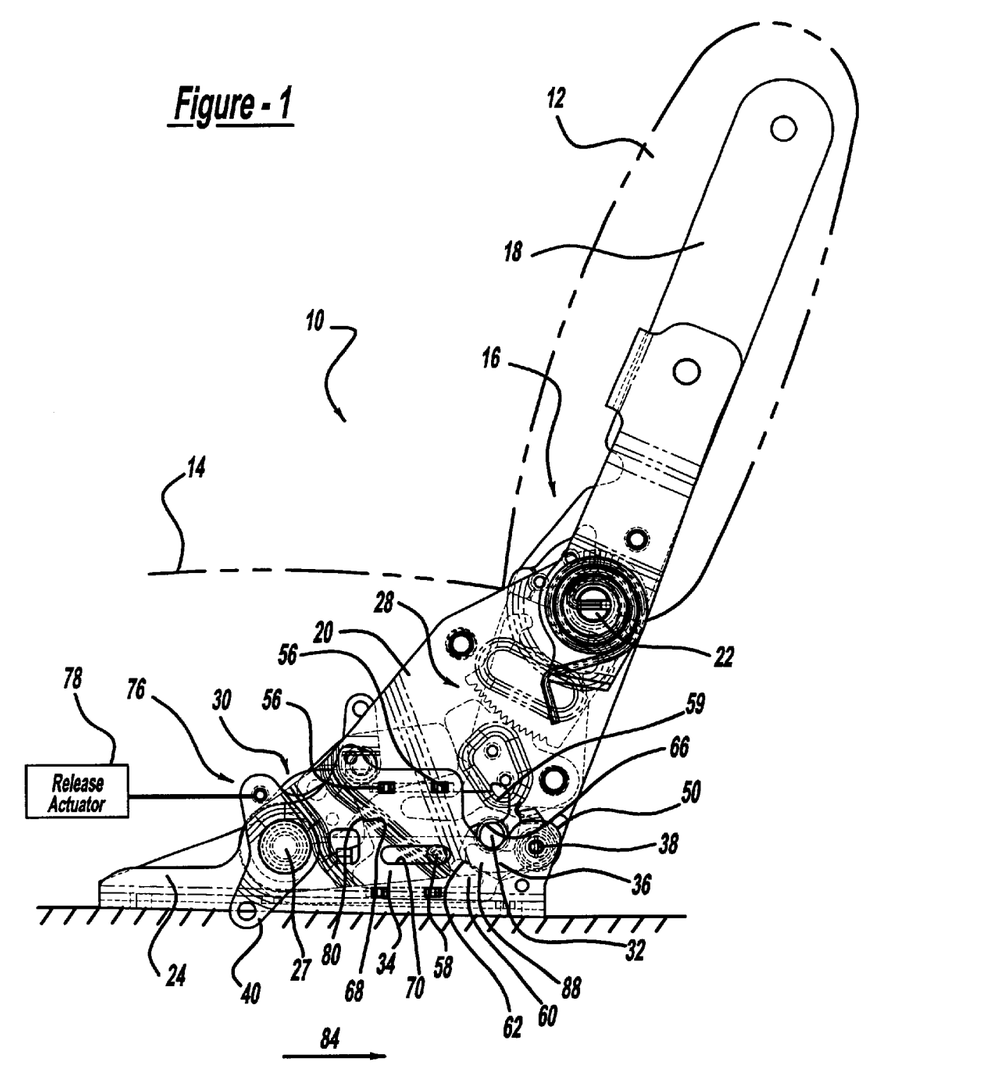
FIG. 1 is a side elevational view of a vehicle seat having the latch assembly of the present invention wherein the seat is in its deployed position and the latch assembly is illustrated in its locked mode.
Figure 2:
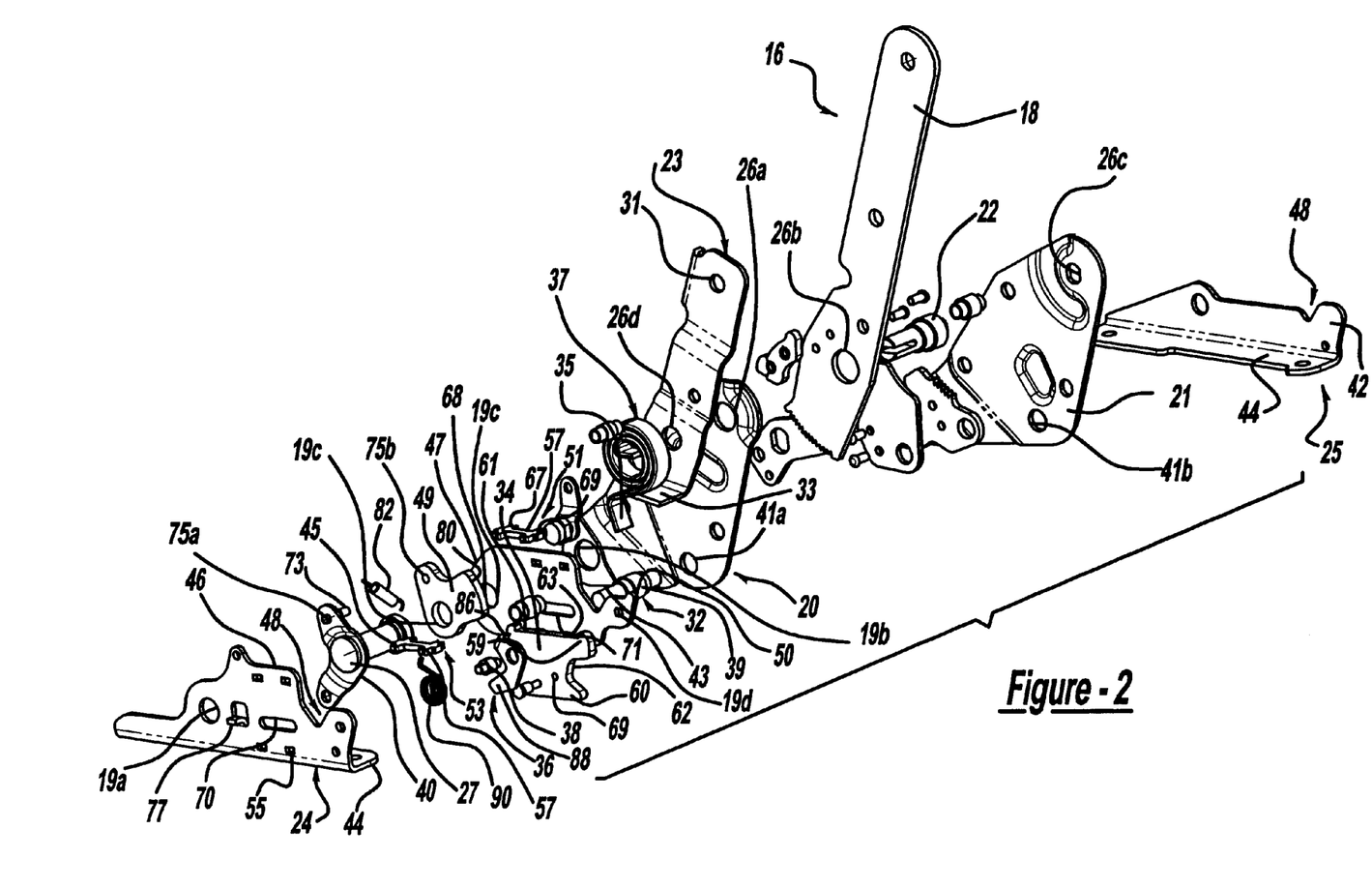
FIG. 2 is an exploded perspective view of the vehicle seat shown in FIG. 1.

The vehicle seat illustrated in FIG. 1 includes a seat frame 16 that, as best illustrated in FIG. 2, includes an upper frame 18, a pair of middle frame plates 20 and 21, a coupling plate 23, and a pair of lower frame members 24 and 25. The upper frame member 18 is adapted to be fixed for rotation with the seatback 12 of the vehicle seat 10. A pivot 22 pivotally connects the upper frame 18 to the outer and inner middle frame plates 20 and 21, respectively, such as through appropriately configured apertures 26a, 26b, and 26c. Each of the inner and outer middle frame plates 20 and 21 are pivotally connected to the outer and inner lower frame members 24 and 25 about a lower pivot 27 that passes through appropriately configured apertures in each of the frame members such as apertures 19a and 19b shown in FIG. 2. Each of the outer and inner lower frame members 24 and 25 are adapted to be fixed to the vehicle floor 29 (FIG. 1) in a manner generally known in the art.

Vehicle seat 10 is of a type contemplated for use in the rear rows of a vehicle and, most particularly, as a third row seat in sport utility vehicles and mini-vans. However, those skilled in the art will appreciate that vehicle seat 10 may be of the "all-belts-to-seat" type (i.e., stand-alone structural seat) as well as for other types of vehicle seats. Moreover, while the seat frame 16 is described herein with reference to FIG. 2, it should be appreciated that the illustrated seat frame is preferably but one of a pair of frames used on the outer sides of the vehicle seat to provide stability and uniform pivoting as described herein.

Finally, coupling plate 23 is coupled to the upper frame 18 and outer middle frame plate 20 to reinforce the pivotal connection therebetween. More particularly, coupling plate 23 includes an aperture 26d sized to accommodate pivot 22 and an upper aperture 31 to accommodate a pin (not shown) for coupling the coupling plate 23 to upper frame 18. Coupling plate 23 also includes a flange 33 at a lower end thereof which engages an end 35 of a coil spring 37 to bias the upper frame toward its full forward position.

The vehicle seat 10 includes a fold mechanism 28 (FIG. 1) that is operable in a latched mode for securing the upper frame 18 in a fixed position relative to the middle frame plates 20 and 21 for retaining the seatback 12 in a reclined position relative to seat bottom 14 within an adjustable range. The fold mechanism 28 is further operable in an unlatched mode for releasing the upper frame member for pivotal movement relative to middle frame plates 20 and 21. Fold mechanisms of the general type illustrated in the drawings are commonly known in the art. Reference may be made to U.S. Pat. Nos. 5,749,625, issued May 12, 1998 to Robinson and 5,622,410, issued Apr. 22, 1997 to Robinson, each assigned to the common assignee of the present invention for a more detailed description of such a fold mechanism, the disclosures of which are hereby incorporated by reference.

Vehicle seat 10 further includes a latch assembly 30 (FIG. 1) that is operable in a locked mode to fix the middle frame plates 20 and 21 to lower frame members 24 and 25 and an unlocked mode wherein the middle frame plates are freely pivotable relative to the lower frame members about lower pivot 27. More particularly, latch assembly 30 includes a striker pin 32 fixed to middle frame plates 20 and 21, a locking plate 34 slidably connected to lower frame member 24, a lockout cam 36 pivotably coupled to lower frame member 24 via a cam pivot pin 38, and a release latch 40 coupled for pivotable movement relative to lower frame member 24 about lower pivot 27.

In the preferred embodiment, each of outer and inner lower frame members 24 and 25 include an upstanding plate 42 extending from a base 44. The upper surface 46 of each of the upstanding plates 42 includes a pin seat 48 having a pair of planar contact surfaces 52 (FIG. 3) that are interconnected by an arcuate segment 54. The striker pin 32 is configured to contact each of the planar contact surfaces 52 when the latch assembly is in its locked mode. More particularly, striker pin 32 includes a collar 39 (FIG. 2) for disposition within apertures 41a and 41b to fix pin 32 for pivotal movement with outer and inner middle frame plates 20 and 21. Pin 32 also includes outer and inner extensions 43 and 45, respectively, that engage the pin seats 48 of the outer and inner lower frame members 24 and 25 when the middle frame plates 20 and 21 are in their set position.

In the illustrated embodiment, the seat frame also includes a latch plate 47 having apertures 19c and 19d for accommodating lower pivot 27 and cam pivot pin 38, respectively, to couple the latch plate 47 to the outer lower frame member 24. As is most clearly illustrated in FIG. 2, the operative components of latch assembly 30 are generally contained between the outer lower frame member 24 and latch plate 47. More particularly, latch assembly 30 further includes upper and lower guide brackets 51 and 53 each including tabs that are disposable within apertures 55 in frame member 24 and latch plate 47 to couple the guide brackets thereto. Each of the guide brackets also include a central web 57. The locking plate 34 is slidably disposed upon the central web 57 of lower guide bracket 53 and the central web 57 of the upper guide bracket 51 is positioned to engage a guide slot 59 on the upper portion of the locking plate 34. More particularly, guide slot 59 includes forward and rearward shoulders 61 and 63 that are engageable with forward and rearward end faces 65 and 67 of the upper guide bracket 51. Locking plate 34 further includes an aperture 69 that accommodates a stabilizer pin 58 (FIG. 1) that is disposed for sliding disposition within motion slots 70 and 71 formed in outer lower frame member 24 and latch plate 47, respectively. The guide brackets, stabilizer pin, and motion slots limit the movement of locking plate 34 relative to lower frame member 24 and the latch plate 47 to linear horizontal movement between the engaged position illustrated in FIG. 1 when the latch assembly is in its locked mode and a disengaged position illustrated in FIG. 5 when the latch assembly is in its unlocked mode. An extension spring 74 (FIG. 3) is coupled to the stabilizer pin 58 and a tab 77 extending from outer lower frame member 24 so as to bias the locking plate toward its disengaged position.

Figure 3:
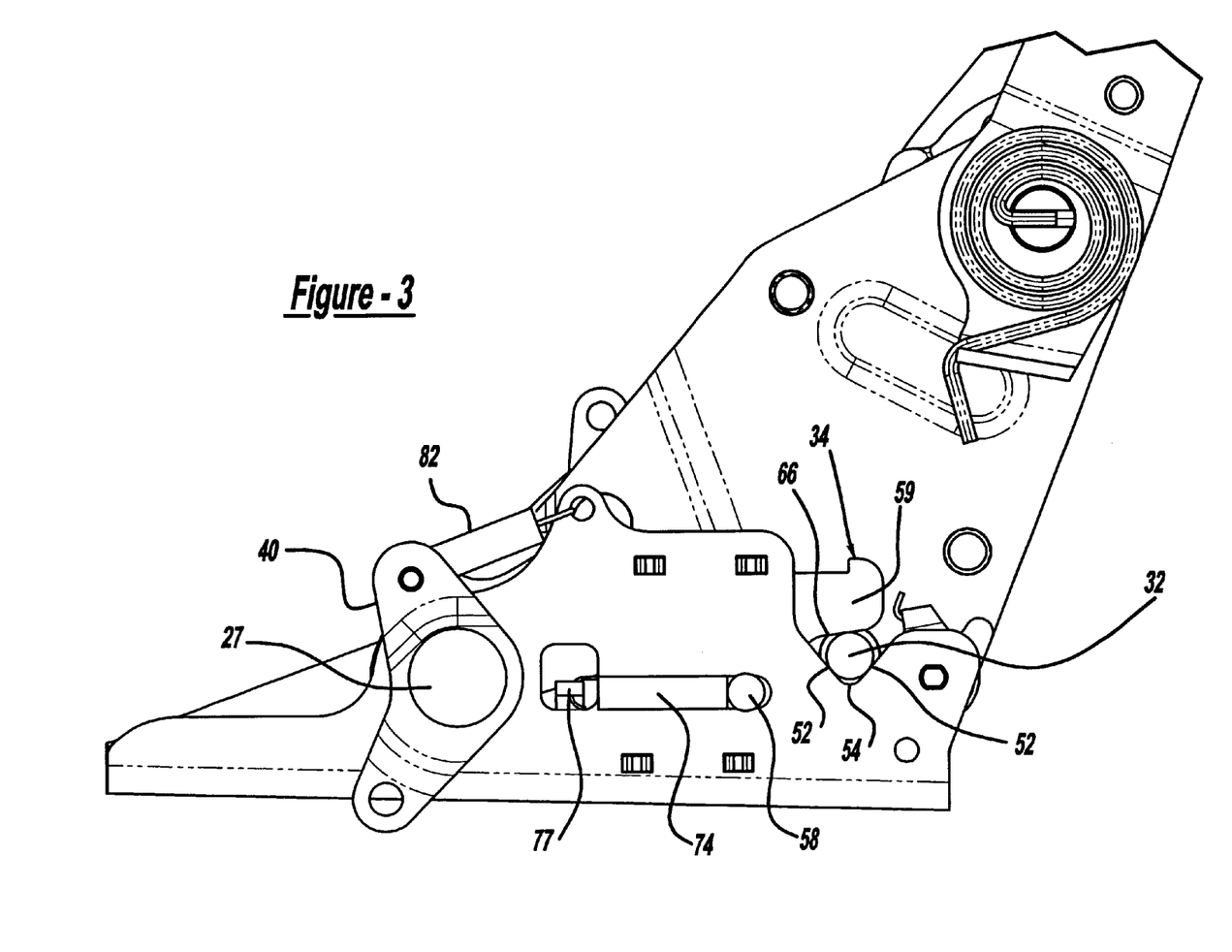
FIG. 3 is an enlarged side elevational view of a portion of the vehicle seat shown in FIG. 1.
Figure 4:
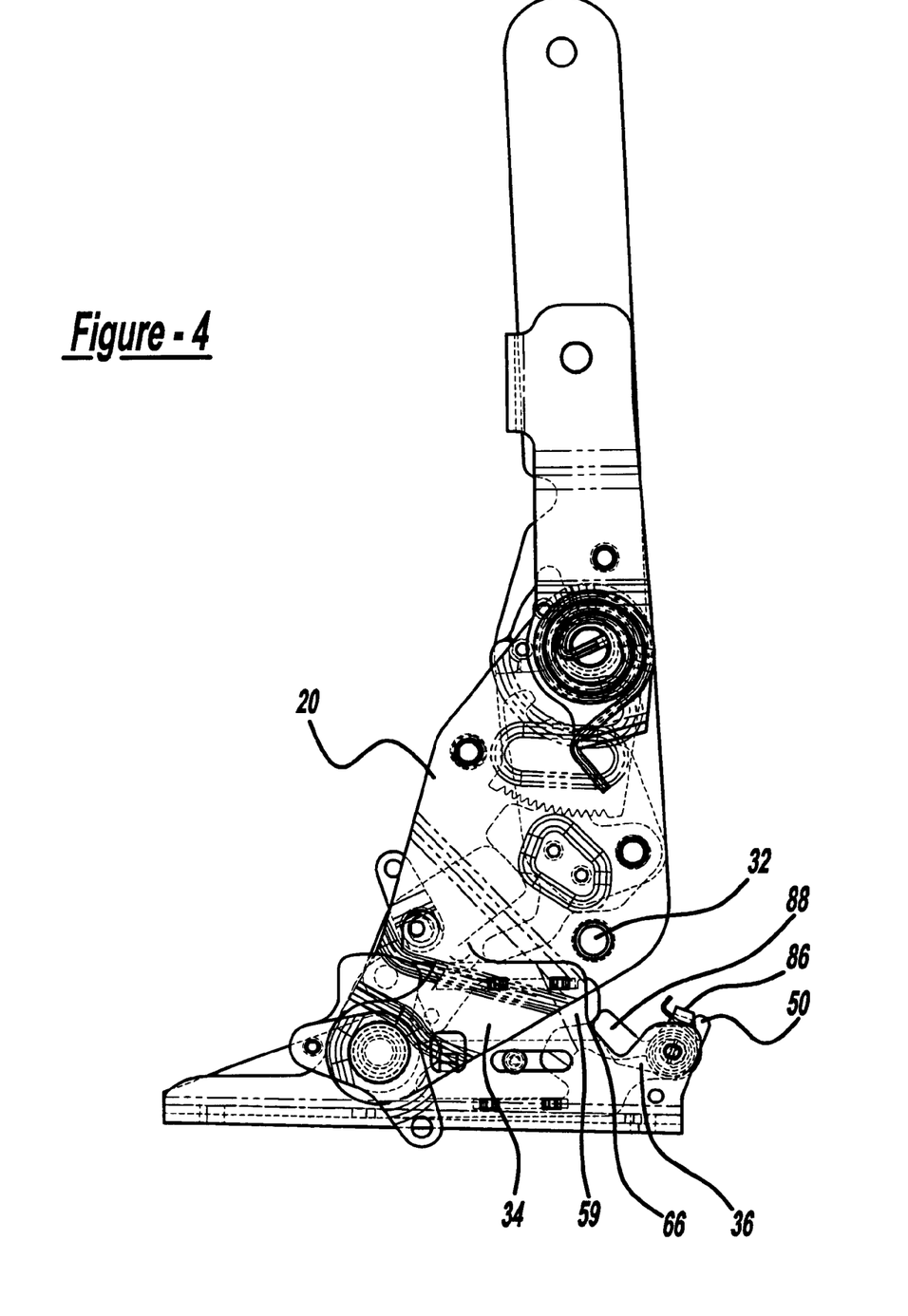
FIG. 4 is a side elevational view of the vehicle seat with the latch assembly in its unlocked mode and the seat is in a forward tilted position.

Latch assembly 30 also includes a release mechanism 76 (FIG. 1) that is operable to move the locking plate 34 from its disengaged position to its engaged position. More particularly, release mechanism 76 is operable in a biasing mode to urge the locking plate into its engaged position as illustrated in FIG. 1 and a released mode to allow the spring 74 to move the locking plate 34 to its disengaged position as illustrated in FIG. 4. Release mechanism 76 includes a release latch 40 coupled for pivotal movement relative to outer lower frame member 24 about lower pivot 27 for rotation between an actuated position (FIG. 1) and a non-actuated position (FIG. 4). An extension spring 82 (FIGS. 2 and 3) urges the release latch 40 toward its actuated position, that is, in a clockwise direction about pivot 27 relative to FIG. 1.

Release mechanism 76 also includes release cam 49 (FIG. 2) which is also pivotally coupled to outer lower frame member 24 and latch plate 47 via pivot 27. An actuating pin 73 is disposed within apertures 75a and 75b to couple the release cam 49 for movement with the release latch 40. Release cam 49 includes an arcuate cam surface 80 that engages the locking plate 34 when the release latch is in its actuated position as shown in FIGS. 1 and 3. More particularly, as is best illustrated in FIGS. 1–3, locking plate 34 includes a detention leg 59, a lower leg 60, and a recess 62 therebetween. Detention leg 59 includes a wedge surface 66 positioned to engage the striker pin 32 when the latch assembly is in its locked mode. Locking plate 34 further includes a forward facing engagement surface 68 that is engageable by arcuate cam surface 80 of release cam 49 to bias the locking plate toward its engaged position as illustrated in FIG. 1.

A release actuator 78 is schematically illustrated in FIG. 1 and is connected to release latch 40 whereby an operator may rotate the release latch counterclockwise toward its disengaged position against the bias of extension spring 82. A variety of mechanical or electromechanical release actuators generally known in the art such as any pole-type, pivoting handle, cable actuated, or other equivalent device may be used as the release actuator without departing from the scope and spirit of the invention as defined by the appended claims.

From the above description, it should be appreciated that the biasing force exerted by spring 82 of release mechanism 76 exceeds the biasing force exerted by spring 74 on locking plate 34. As a result, the locking plate 34 is normally biased in a rearward direction toward its engaged position as generally indicated by arrow 84 when the release mechanism is in its normal biasing mode.

As generally discussed above, lockout cam 36 is pivotably coupled to the outer lower frame member 24 and latch plate 47 to rotate about cam pivot pin 38 and between a blocking position (FIG. 4) and a retracted position (FIG. 1). Lockout cam 36 generally includes a stop leg 86 and a blocking leg 88 (FIG. 2). In its blocking position, stop leg 86 engages a stop 50 on latch plate 47 to prevent further clockwise rotation of lockout cam 36 and maintain the lockout cam 36 in its blocking position (FIG. 4). In the blocking position, the blocking leg 88 is positioned to engage the detention leg 59 of locking plate 34 to maintain the locking plate in its disengaged position against the urging of release cam 49. A spring 90 (FIG. 2) is in operative engagement with lockout cam 36 to bias the cam toward clockwise rotation about pin 38 and into its blocking position.

Figure 5:
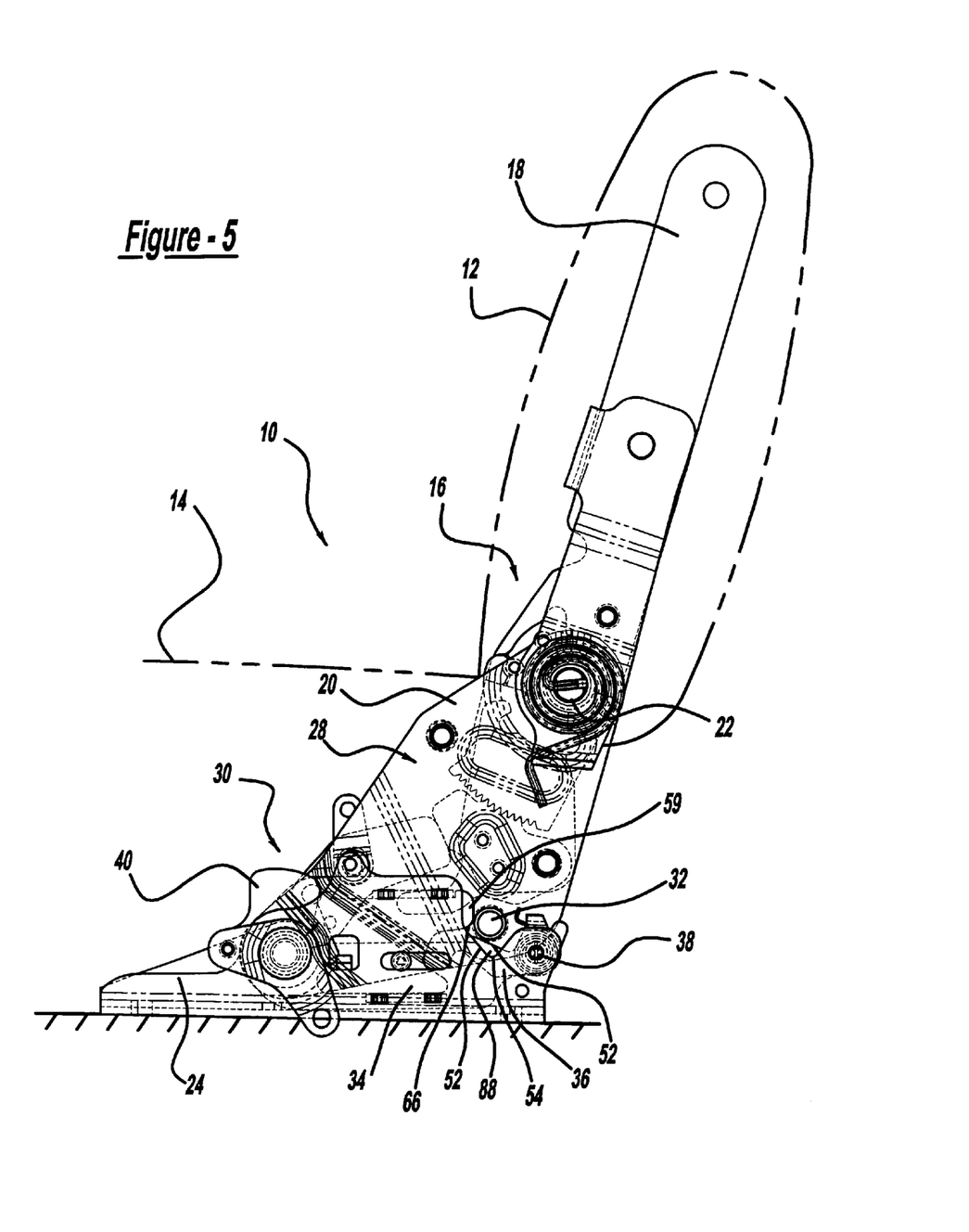
FIG. 5 is a side elevational view of the vehicle seat frame tilted slightly forward of its deployed position and the latch assembly between its locked and unlocked modes.

The operation of latch assembly 30 will now be described with reference to FIG. 1 wherein the latch assembly is illustrated in its locked mode, FIG. 4 wherein latch assembly 30 is illustrated in its unlocked mode, and FIG. 5 wherein the vehicle seat is tilted slightly forward of its set position and the latch mechanism is being moved from its unlocked mode to its locked mode. Latch assembly 30 will normally be operated in its locked mode illustrated in FIG. 1 wherein the middle frame plates 20 and 21 are in their set positions relative to lower frame members 24 and 25. When it is desired to tilt the seat to its forward folded position, the operator displaces the release mechanism 76 from its biasing mode (FIG. 1) to its released mode (FIGS. 4 and 5) such as through manipulation of release actuator 78 causing the rotation of release latch 40 and blocking cam 49 from their actuated position (FIG. 1) to their non-actuated position (FIGS. 4 and 5). After the arcuate cam surface 80 of release cam 49 is removed from engagement with engagement surface 68 of locking plate 34, extension spring 74 slides the locking plate 34 under the guidance of bracket 51, stabilizer pin 57 and motion slots 70 and 71 from its engaged position (FIG. 1) toward its disengaged position (FIG. 4).

Once the locking plate 34 is in its disengaged position, the striker pin 32 is movable relative to the outer and inner lower frame members 24 and 25 and the middle frame plates 20 and 21 are pivotable about lower pivot 27. As the seat is pivoted forward, the striker pin 32 is displaced from pin seat 48 and lockout cam 36 rotates clockwise toward its blocking position under the bias of spring 90. More particularly, as best illustrated in FIG. 5, during the tilting displacement of the middle frame plates 20 and 21 relative to the lower frame members 24 and 25, the striker pin 32 and/or blocking leg 88 of cam 36 are positioned to abut detention leg 59 of locking plate 34 to prevent movement of the locking plate back toward its engaged position. When the seat is tilted such that pin 32 is out of engagement with detention leg 59 and blocking leg 88, spring 90 displaces lockout cam 36 to its blocking position whereupon stop leg 86 engages stop 50 of lower frame member 24 and blocking leg 88 is in abutting relation with detention leg 59. When the lockout cam 36 is in its blocking position. In this unlocked mode, the blocking leg 88 prevents the locking plate from moving to its engaged position as shown in FIG. 4.

Movement of the latch assembly from its unlocked mode to its locked mode is initiated by returning the middle frame plates 20 and 21 from their forward tilted position to their set position. More particularly, as the middle frame members approach their set position, striker pin 32 engages blocking leg 88 to displace lockout cam 36 in a counterclockwise direction against the urging of spring 90 (FIG. 5). After the blocking leg 88 and striker pin 32 are displaced below detention leg 59, the locking plate 34 is free to move into its engaged position under the urging of blocking cam 49 and, more particularly, spring 82.

When latch assembly 30 is in its locked mode as shown in FIGS. 1 and 3, striker pin 32 is restrained by wedging engagement between the wedge surface 66 of locking plate 34 and the planar contact surfaces 52 defined by pin seat 48. This three point metal-to-metal contact securely restrains the locking pin against undesirable movement. Chucking is further reduced by the continued bias of locking plate 34 in the direction of its engaged position. More particularly, differential movement of the striker pin relative to the locking plate and lower frame member may allow further displacement of the locking plate 34 toward its engaged position under the force of spring 82 thereby tightening the wedging contact and even more securely restraining the striker pin 32 within pin seat 48 as described above.

Finally, it should be appreciated that the configuration and operation of latch assembly 30 provides aesthetic and functional advantages over the prior art at least in that the latch assembly does not include components that protrude from lower frame member 24 when the latch assembly is in its unlocked mode and the seat is tilted forward.

The foregoing discussion discloses and describes an exemplary embodiment of the present invention. One skilled in the art will readily recognize from such discussion, and from the accompanying drawings and claims that various changes, modifications and variations can be made therein without departing from the true spirit and fair scope of the invention as defined by the following claims.

What is claimed is:

1. A latch assembly for use with a vehicle having a floor and a seat with a seat bottom and a seatback, said latch assembly comprising:

a first frame member adapted to be fixed to the floor;

a second frame member adapted to be fixed to the seat bottom, said second frame member coupled to the first frame member for movement between a set position and a tilted position;

a locking mechanism coupled to one of the first and second frame members for movement between a locked mode to lock the second frame member in its set position and an unlocked mode wherein the second frame member is freely movable relative to the first frame member;

a release mechanism operable in a biasing mode to operatively engage said locking mechanism and exert a first biasing force urging said locking mechanism toward its locked mode and a released mode removed from operative engagement with the locking mechanism;

a spring exerting a second biasing force urging said locking mechanism toward its unlocked mode, said second biasing force being less than said first biasing force such that said locking mechanism is urged toward its locked mode when said release mechanism is in its biasing mode and into its unlocked mode when said release mechanism is in its released mode; and a lockout cam operable in a blocking position to maintain the locking mechanism in its unlocked mode when said second frame member is in said tilted position and a retracted position wherein the locking mechanism is movable from its unlocked mode to its locked mode.

2. The latch assembly of claim 1 wherein said lockout cam moves from said blocking position to said retracted position when said second frame member is moved into said set position.

3. The latch assembly of claim 2 further including a striker pin coupled to the other of the first and second frame members, said striker pin moving said lockout cam from said blocking position to said released position when said second frame member is moved into said set position.

4. The latch assembly of claim 3 wherein said latch assembly further includes a second spring biasing the lockout cam toward its blocking position.

5. The latch assembly of claim 3 wherein said locking mechanism is coupled to said first frame member and wherein said striker pin is fixed to said second frame member.

6. The latch assembly of claim 3 wherein said locking mechanism includes a locking plate coupled to one of said first and second frame members for linear movement relative thereto between an engaged position when said locking mechanism is in said locked mode and a disengaged position when said locking mechanism is in said unlocked mode.

7. The latch assembly of claim 6 wherein said locking mechanism further includes a stabilizer pin fixed to said locking plate, wherein one of said first and second frame members includes a motion slot, and wherein said stabilizer pin is slidably disposed for movement in said motion slot to restrict said locking plate to linear movement.

8. The latch assembly of claim 6 wherein said first frame member includes a pin seat, wherein the striker pin is disposed in the pin seat when the second frame member is in its set position, and wherein said locking plate wedges said striker pin against said pin seat when said latch mechanism is in said locked mode.

9. The latch assembly of claim 8 wherein said striker pin contacts two points on said pin seat and one point on said locking plate when said second frame member is in said set position and said locking plate is in said engaged position.

10. The latch assembly of claim 6 wherein said lockout cam includes a stop that engages said first frame member when said lockout cam is in said blocking position to prevent movement of said cam past said blocking position.

11. The latch assembly of claim 6 wherein said release mechanism is coupled to said one of said first and second frame members for rotational movement about a pivot, wherein said locking mechanism includes an engagement surface, and wherein said release mechanism defines a contact surface engaging said engagement surface to urge said locking mechanism toward its locked mode when said release mechanism is in its biasing mode, and wherein said release mechanism includes a spring biasing said release latch in a first direction corresponding to the biasing mode of said release mechanism.

12. A vehicle seat adapted to be coupled to a vehicle floor, said vehicle seat comprising:

a seat frame including a first frame member adapted to be fixed to the vehicle floor and a second frame member pivotably coupled to the first frame member for movement between a set position and a tilted position;

a locking mechanism coupled to one of the first and second frame members for movement between a locked mode to lock the second frame member in its set position and an unlocked mode wherein the second frame member is freely movable relative to the first frame member;

a release mechanism operable in a biasing mode to operatively engage said locking mechanism and exert a first biasing force urging said locking mechanism toward its locked mode and a released mode removed from operative engagement with the locking mechanism;

a spring exerting a second biasing force urging said locking mechanism toward its unlocked mode, said second biasing force being less than said first biasing force such that said locking mechanism is urged toward its locked mode when said release mechanism is in its biasing mode and into its unlocked mode when said release mechanism is in its released mode; and a lockout cam operable in a blocking position to maintain the locking mechanism in its unlocked mode when said second frame member is in said tilted position and a retracted position wherein the locking mechanism is movable from its unlocked mode to its locked mode.

13. The vehicle seat of claim 12 wherein said lockout cam moves from said blocking position to said retracted position when said second frame member is moved into said set position.

14. The vehicle seat of claim 13 further including a striker pin coupled to the other of the first and second frame members, said striker pin moving said lockout cam from said blocking position to said released position when said second frame member is moved into said set position.

15. The vehicle seat of claim 14 wherein said latch assembly further includes a second spring biasing the lockout cam toward its blocking position.

16. The vehicle seat of claim 14 wherein said locking mechanism is coupled to said first frame member and said striker pin is fixed to said second frame member.

17. The vehicle seat of claim 12 wherein said locking mechanism includes a locking plate coupled to one of said first and second frame members for linear movement relative thereto between an engaged position when said locking mechanism is in said locked mode and a disengaged position when said locking mechanism is in said unlocked mode.

18. The vehicle seat of claim 17 wherein said locking mechanism further includes a stabilizer pin fixed to said locking plate, wherein one of said first and second frame members includes a motion slot, and wherein said stabilizer pin is slidably disposed for movement in said motion slot to restrict said locking plate to linear movement.

19. The vehicle seat of claim 17 wherein said first frame member includes a pin seat, wherein the striker pin is disposed in the pin seat when the second frame member is in its set position, and wherein said locking plate wedges said striker pin against said pin seat when said latch mechanism is in said locked mode.

20. The vehicle seat of claim 19 wherein said locking pin contacts two points on said pin seat and one point on said locking plate when said second frame member is in said set position and said locking plate is in said engaged position.

21. The vehicle seat of claim 17 wherein said lockout cam includes a stop that engages said first frame member when said lockout cam is in said blocking position to prevent movement of said cam past said blocking position.

22. The vehicle seat of claim 17 wherein said release mechanism is coupled to said one of said first and second frame members for rotational movement about a pivot, wherein said locking mechanism includes an engagement surface, and wherein said release mechanism defines a contact surface engaging said engagement surface to urge said locking mechanism toward its locked mode when said release mechanism is in its biasing mode, and wherein said release mechanism includes a spring biasing said release latch in a first direction corresponding to the biasing mode of said tilt release mechanism.

23. A latch assembly for use in a vehicle having a movable component and a fixed component, said latch assembly comprising:
  a first frame member adapted to be fixed to the fixed component of the vehicle;
  a second frame member adapted to be fixed to the movable member of the vehicle, said second frame member coupled to the first frame member for movement between a first operative position and a second position;
  a locking mechanism coupled to one of the first and second frame members for movement between a locked mode to lock the second frame member in its first operative position and an unlocked mode wherein the second frame member is freely movable relative to the first frame member;
  a release mechanism operable in a biasing mode to operatively engage said locking mechanism and exert a first biasing force urging said locking mechanism toward its locked mode and a release mode removed from operative engagement with the locking mechanism;
  a spring exerting a second biasing force urging said locking mechanism toward its unlocked mode, said second biasing force being less than said first biasing force such that said locking mechanism is urged toward its locked mode when said release mechanism is in its biasing mode and into its unlocked mode when said release mechanism is in its released mode; and
  a lockout cam operable in a blocking position to maintain the locking mechanism in its unlocked mode when said second frame member is in said second position and a retracted position wherein said locking mechanism is movable from its unlocked mode to its locked mode.

24. The latch assembly of claim 23 wherein said lockout cam moves from said blocking position to said retracted position when said second frame member is moved into said set position.

25. The latch assembly of claim 24 further including a striker pin coupled to the other of the first and second frame members, said striker pin moving said lockout cam from said blocking position to said released position when said second frame member is moved into said set position.

26. The latch assembly of claim 25 wherein said locking mechanism includes a locking plate coupled to one of said upper and lower frame members for linear movement relative thereto between an engaged position when said locking mechanism is in said locked mode and a disengaged position when said locking mechanism is in said unlocked mode.

27. The latch assembly of claim 26 wherein said locking mechanism further includes a stabilizer pin fixed to said locking plate, wherein one of said upper and lower frame members includes a motion slot, and wherein said stabilizer pin is slidably disposed for movement in said motion slot to restrict said locking plate to linear movement.

* * * * *